（12） United States Patent
Boatman et al.

(10) Patent No.: US 10,059,402 B2
(45) Date of Patent: Aug. 28, 2018

(54) HIGH PRESSURE FLUID SWIVEL (71) Applicant: SOFEC, INC., Houston, TX (US)

(72) Inventors: L. Terry Boatman, Spicewood, TX (US); Stephane Roy, Houston, TX (US)

(73) Assignee: SOFEC, INC., Houston, TX (US)

( * ) Notice: Subject to any disclaimer, the term of this patent is extended or adjusted under 35 U.S.C. 154(b) by 379 days.

(21) Appl. No.: 14/791,013

(22) Filed: Jul. 2, 2015

(65) Prior Publication Data
US 2017/0002964 A1    Jan. 5, 2017

(51) Int. Cl.
F16L 39/06 (2006.01)
B63B 1/00 (2006.01)
E21B 1/00 (2006.01)
F17C 1/00 (2006.01)

(52) U.S. Cl.
CPC ............... B63B 1/00 (2013.01); E21B 1/00 (2013.01); F16L 39/06 (2013.01); F17C 1/00 (2013.01)

(58) Field of Classification Search
CPC ...................................................... F16L 39/06
See application file for complete search history.

(56) References Cited

U.S. PATENT DOCUMENTS

| 2,322,679 | A | * | 6/1943 | Williamson | .......... | E21B 33/085 277/326 |
| 3,351,360 | A | * | 11/1967 | Faccou | .................. | F16L 39/06 285/111 |
| 4,052,090 | A | * | 10/1977 | Stafford | .................. | F16L 39/06 285/121.6 |
| 4,111,467 | A | * | 9/1978 | de Fremery | ............ | F16L 39/06 285/190 |
| 4,174,127 | A | * | 11/1979 | Carn | ....................... | F16L 39/06 285/281 |
| 4,289,336 | A | * | 9/1981 | Bajeux | ..................... | F16L 39/06 285/272 |
| 4,405,162 | A | * | 9/1983 | Williams | ................. | F16L 39/06 285/121.6 |
| 4,555,118 | A | * | 11/1985 | Saliger | ..................... | F16L 39/06 285/275 |
| 4,570,978 | A | * | 2/1986 | Arendt | .................. | D06F 31/005 285/121.6 |

(Continued)

FOREIGN PATENT DOCUMENTS

EP    1398560 A1 *  3/2004  ............. F16L 39/06

Primary Examiner — David Bochna
(74) Attorney, Agent, or Firm — Bracewell LLP; Douglas W. Rommelmann (57) ABSTRACT A high pressure swivel is disclosed which includes swivel modules each having a stationary inner structure and a rotatable outer structure that can rotate about the inner structure. The inner structure of each module has the same number of vertical passages as the others. The inner structure of each module has a circumferential flange on the top and on a bottom lip so that each swivel unit can be secured to another swivel in its top or bottom with clamps around the flanges. The inner structures are rotatably positioned with respect to each other when assembled so that a vertical passage from a stationary base manifold to an outlet on the rotatable outer structure is formed. Various combinations of standard swivel modules can be assembled to accommodate specific swivel stack requirements for flow capacity and separate or comingled flow paths.

32 Claims, 9 Drawing Sheets (56) References Cited

U.S. PATENT DOCUMENTS

| | | | |
|---|---|---|---|
| 4,602,806 A | | 7/1986 | Saliger |
| 4,647,076 A | * | 3/1987 | Pollack .................. F16L 39/06 285/272 |
| 4,647,077 A | * | 3/1987 | Ethridge ................ F16L 39/06 285/281 |
| 4,662,657 A | * | 5/1987 | Harvey .................. F16L 39/06 277/352 |
| 4,669,758 A | | 6/1987 | Feller et al. |
| 4,756,559 A | * | 7/1988 | Shimada ................ F16L 39/06 285/272 |
| 4,819,966 A | | 4/1989 | Gibb |
| 5,411,298 A | | 5/1995 | Pollack |
| 5,823,837 A | * | 10/1998 | Boatman ............... B63B 21/507 114/230.12 |
| 6,053,787 A | | 4/2000 | Erstad et al. |
| 6,234,540 B1 | | 5/2001 | Drijver |
| 6,450,546 B1 | * | 9/2002 | Montgomery .......... F16L 39/06 285/121.1 |
| 9,605,786 B2 | * | 3/2017 | Boatman ................ F16L 39/06 |
| 2017/0002964 A1 | * | 1/2017 | Boatman ................ F16L 39/06 |

\* cited by examiner

HIGH PRESSURE FLUID SWIVEL

BACKGROUND OF THE INVENTION

1. Field of the Invention

This invention relates in general to swivel equipment for transferring fluids. In particular, the invention relates to a fluid swivel joint for a swivel stack assembly adapted for transferring fluids between tankers, storage vessels and the like and one or more conduits beneath the ocean surface. The fluid of the swivel may be product such as hydrocarbons to be transferred from the seabed to a vessel or may be water or gas to be transferred from the vessel to the seabed for well stimulation.

Still more particularly, the invention relates to a novel fluid joint which can be stacked with one or more other fluid joints of like design so that a swivel stack can be assembled in a short time from an inventory of the fluid joints.

2. Description of the Prior Art

The offshore search for oil and gas has greatly expanded in recent years and progressed into deep rough waters such as the North Sea. To facilitate production of oil and gas from remotely located offshore fields, complex mooring systems for offshore loading terminals, which serve as centralized production sites for the entire field, have been developed. Flexible fluid lines, called risers, extend from a subsea location to the mooring site to permit the transfer of fluids between a moored vessel and a subsea location. For example, certain fluid lines may be used to convey oil and gas into the floating vessel while other fluid lines may be used to inject liquids or gases back from the vessel into subsea wells for purpose of control, well stimulation, or storage.

Floating vessels can be moored to a single point mooring system, which permits the vessel to weathervane and rotate 360° about a single mooring point. To permit the vessel to rotate and move freely without causing twisting or entanglement of the various risers to which the vessel is attached, it is necessary to provide a fluid swivel assembly to connect the fluid lines to the mooring site. Furthermore, since a plurality of risers are involved, it is necessary that two or more swivel modules be stacked in order to have the capability of accommodating multiple fluid lines or risers.

Separate swivel units or modules are stacked on top of each other with a swivel stack base fixed to a stationary frame which is anchored to the sea floor.

Prior high pressure product swivels have provided an inner housing and an outer housing which is rotatively supported on the inner housing by a bearing so that the outer housing is free to rotate about the inner housing. A toroidally shaped conduit chamber is formed between the two housings when the two housings are placed in registration with each other. An inlet from the inner housing communicates with the chamber, and an outlet in the outer housing communicates with the chamber. Upper and lower dynamic seals in the form of face seals or radial seals are placed in grooves or gaps between axially opposed or radially opposed surfaces of the inner and outer housings to prevent fluid from leaking past the two facing surfaces while the high pressure fluid is present in the chamber.

Prior swivel assemblies have required swivel units to be stacked on top of each other with each unit having its inner housing bolted to the inner housing of a unit stacked above or below. Furthermore, the entire stack of swivel units have been bolted to a base housing. Such an assembly functions properly as a swivel stack unit, but construction of the units and assembly requires that each stack be engineered for each requirement of an offshore application. Such prior assemblies have been costly to design, engineer, and build and have required a long lead time from contract signing to construction and delivery of the swivel stack.

3. Identification of Objects of the Invention

A primary object of the invention is to provide a high pressure fluid swivel arrangement constructed from swivel units or modules that can be stacked and secured to each other without securing the swivel units together with long bolts through their inner housing.

Another object of the invention is to provide a pre-designed fluid swivel unit or module having vertical passages such that fluid swivel units can be pre-constructed and then stacked on top of each other and to a base housing so that fluid passages can be aligned from the base housing to desired outlets of the stacked fluid swivel units.

SUMMARY OF THE INVENTION

The objects identified above, as well as other advantages and features of the invention are incorporated in a rotatable fluid swivel unit and an assembly of such units into a swivel stack onto a base housing. Each swivel unit has inner and outer housings with one or more fluid pressure carrying radial annular groove cavities in the annular outer housing. Each annular groove cavity has one or more outlets from the outer housing. Each swivel unit has at least one vertical passage in the inner housing that terminates at a radial groove, but has other swivel vertical passages spaced equally from each other around a circle of a horizontal cross section through the inner housing.

An assembly of such swivel units is made from pre-constructed swivel units so as to achieve desired flow paths from the base housing to the radial outlets in the outer housings of the stacked modules.

BRIEF DESCRIPTION OF THE DRAWINGS

The objects, advantages, and features of the invention will become more apparent by reference to the drawings which are appended hereto, wherein like reference numbers indicate like parts, and wherein an illustrative embodiment of the invention is shown, of which.

DESCRIPTION OF THE INVENTION

Figure 1:
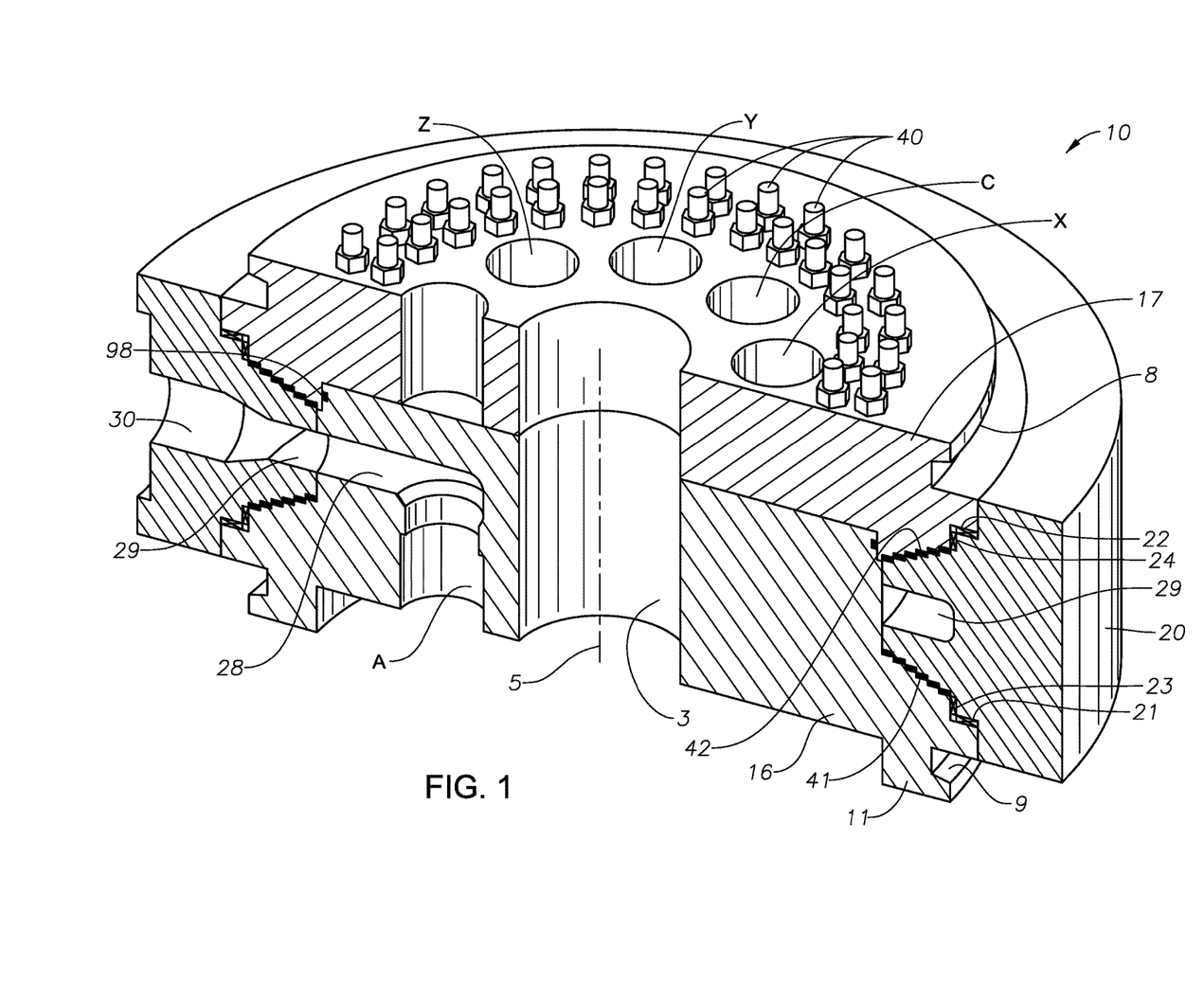
FIG. 1 is a cross section view of a swivel module with a stationary inner annular structure and a rotatable outer housing with a plurality of vertical fluid passages spaced around a circle of the inner annular structure with one of the passages terminating at a fixed radial groove in the stationary inner structure, the groove communicating with a radial outlet of the rotatable outer housing.
Figure 2A:
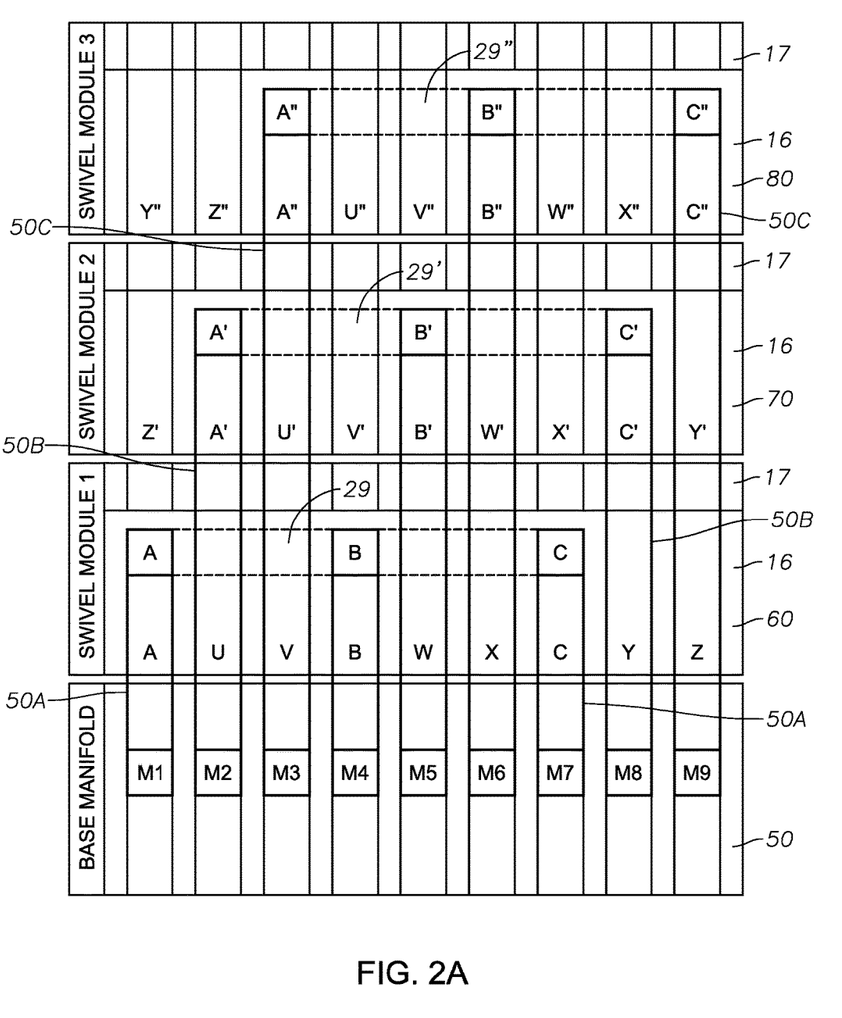
FIG. 2A in a flat layout illustration showing the stationary inner structure of three identical swivel units stacked on top of each other and onto a base housing with certain vertical passages terminating at a lower swivel unit and other vertical passages communicating with vertical passages of units stacked above.
Figure 2B:
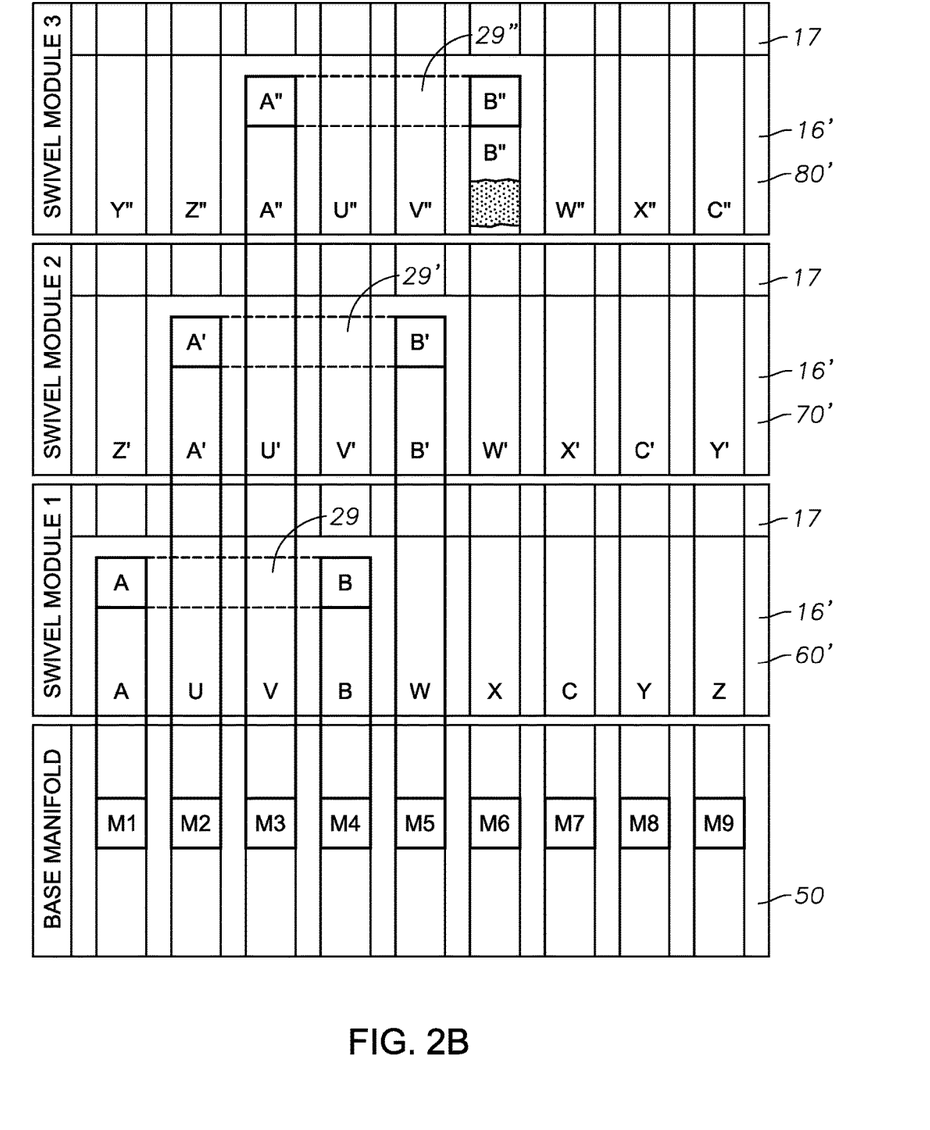
FIG. 2B is another flat layout illustration showing the stationary inner structure of three identical swivel units stacked on top of each other onto a base housing with a set of two vertical passages terminating at a lower swivel unit, with one passage blocked off and other vertical passages communicating with vertical passages of units stacked above.
Figure 3:
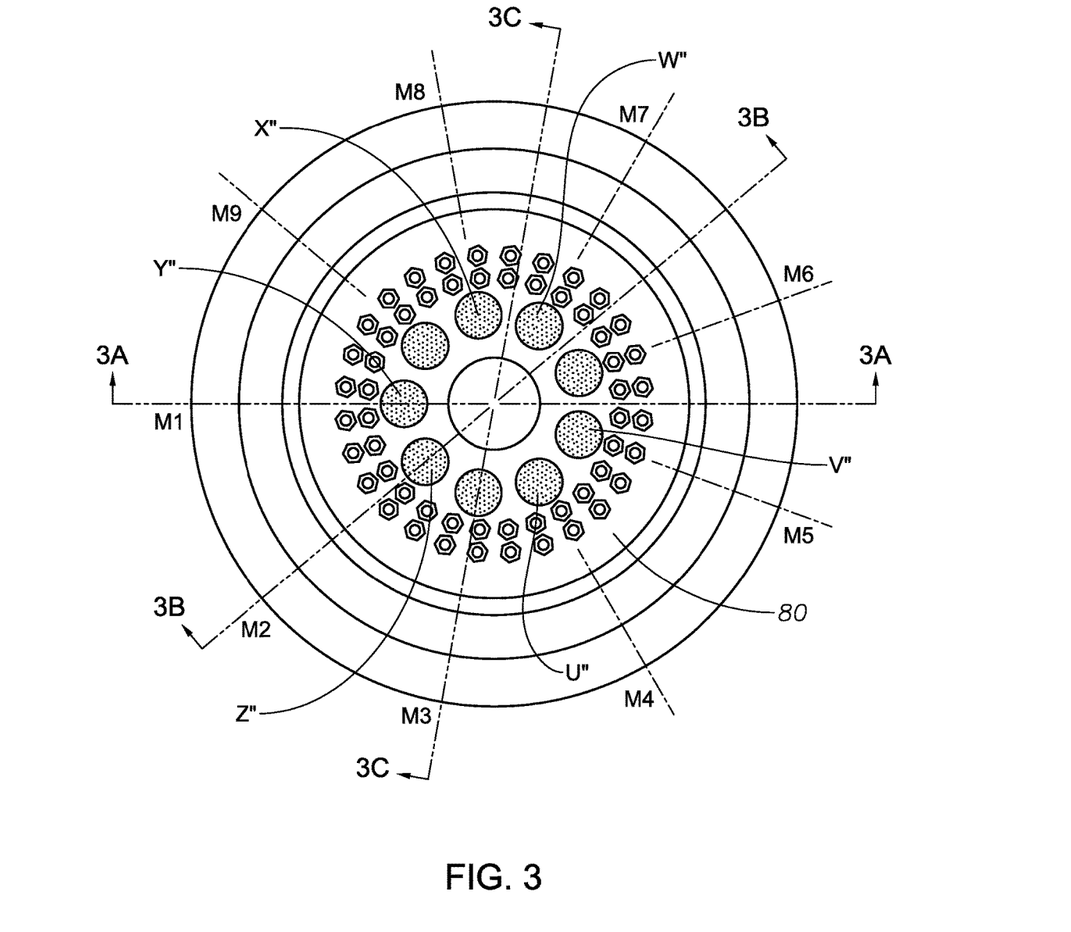
FIG. 3 is a top view of the swivel modules of FIG. 2A showing section lines 3A-3A, 3B-3B, and 3C-3C of a swivel assembly that is illustrated in FIGS. 3A, 3B, and 3C.
Figure 3A:
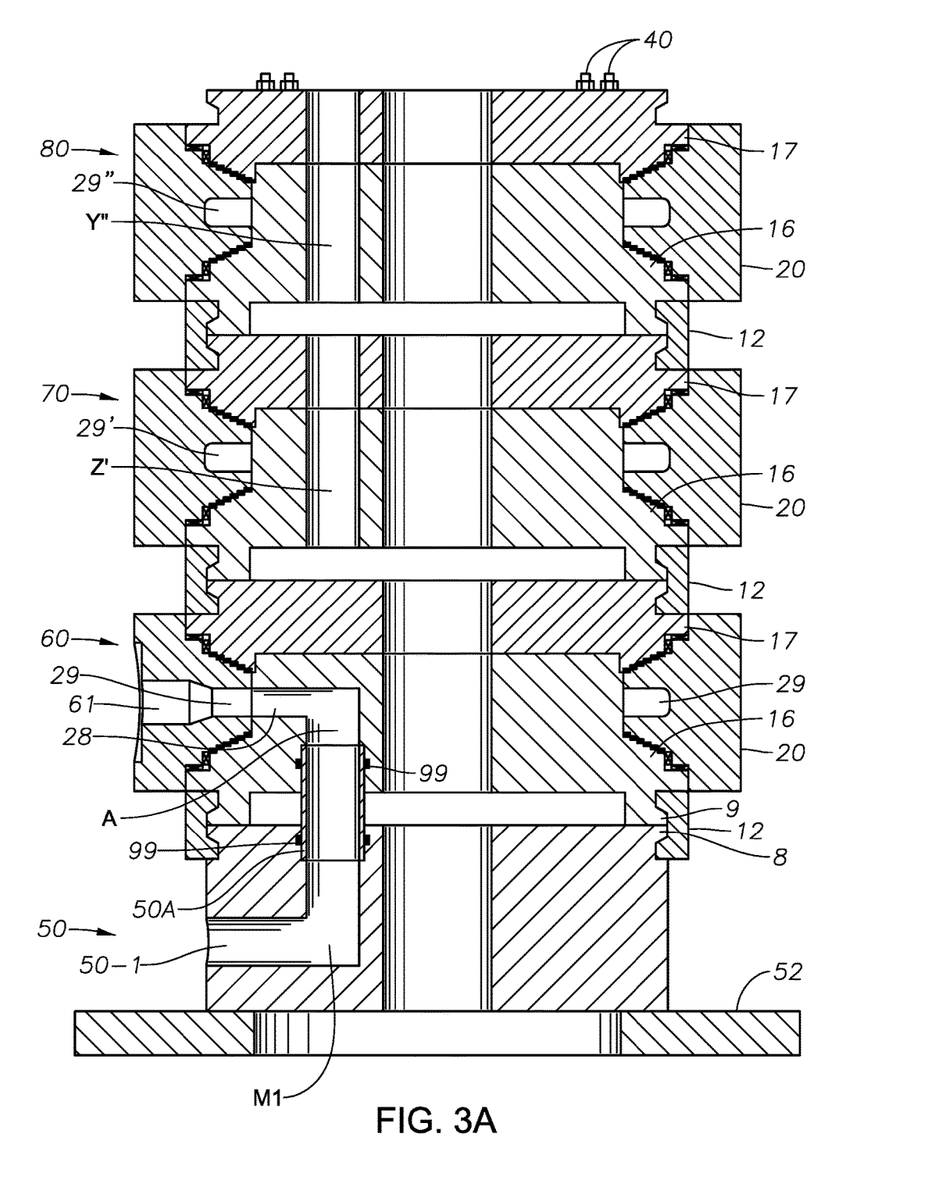
FIGS. 3A, 3B and 3C are three separate section views (as indicated in FIG. 3) of a stack of three identical swivel units each having a stationary inner annular structure with nine vertical passages as shown in FIG. 2A.
Figure 3B:
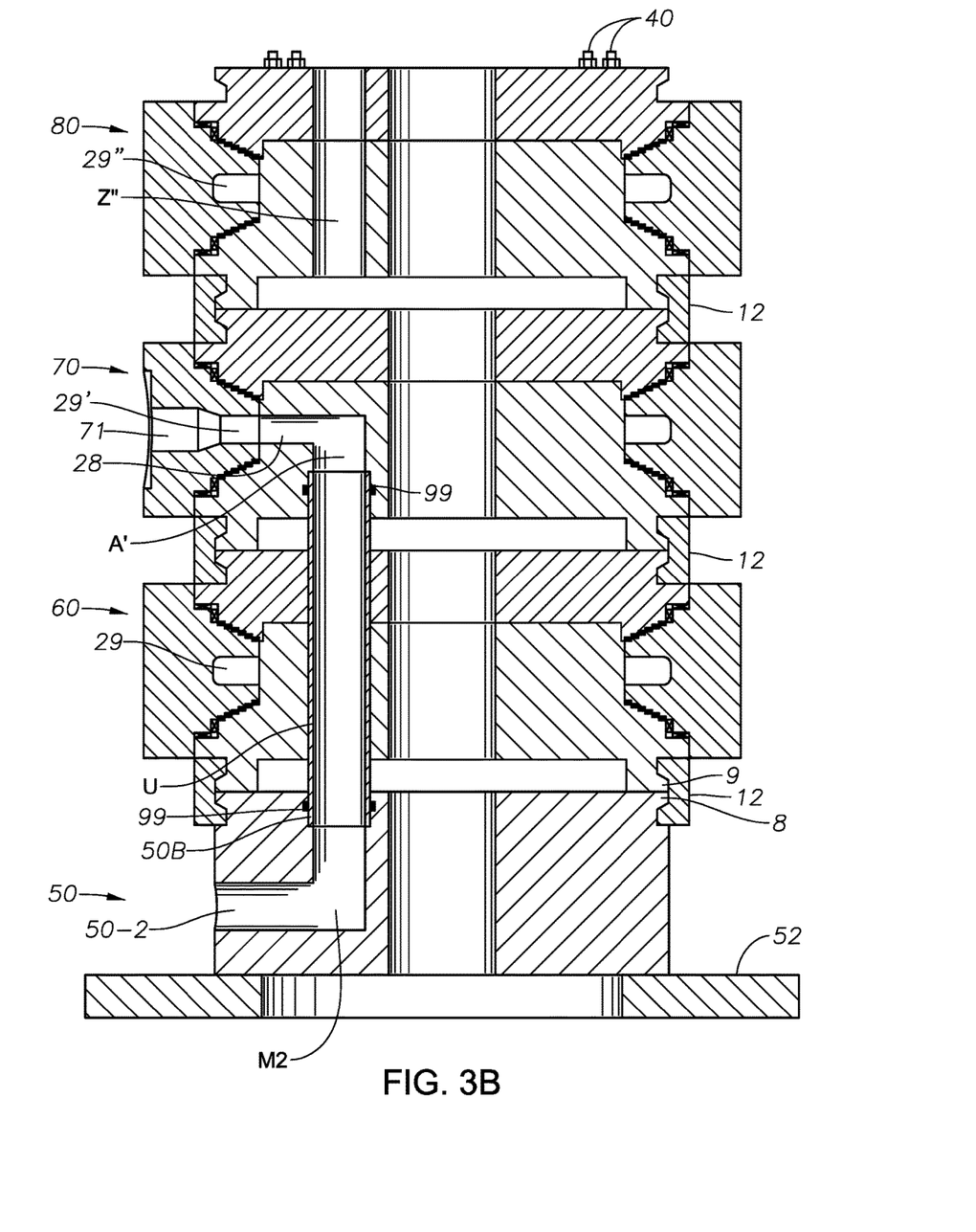
Figure 3C:
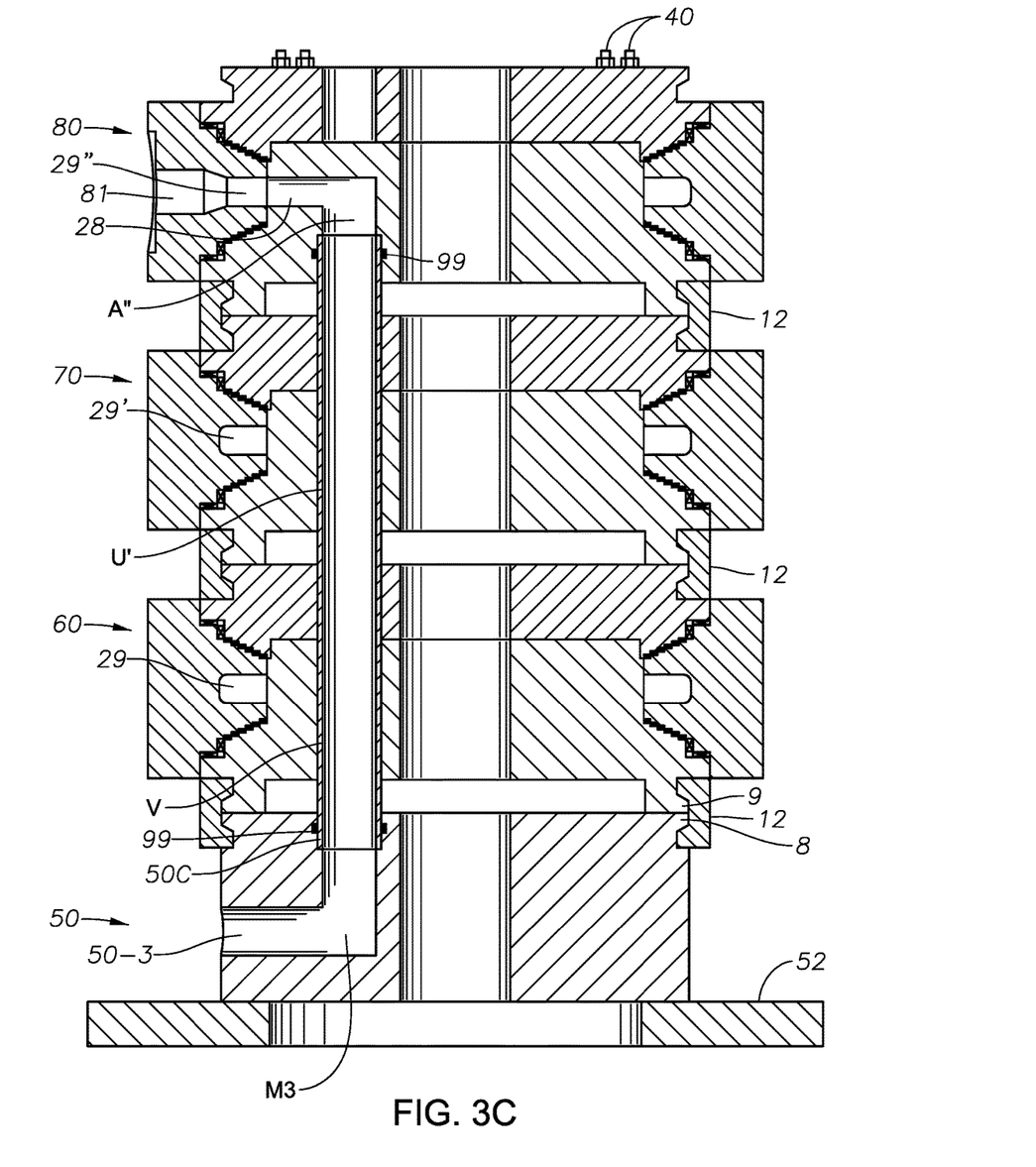

The aspects, features, and advantages of the invention summarized above are described in more detail below by reference to the drawings where like reference numerals represent like elements. The following table provides a list of reference numbers used in this specification and the features that they represent:

| Reference Numeral | Feature |
| --- | --- |
| 3 | central passage |
| 5 | central longitudinal axis |
| 8 | upper flange |
| 9 | lower flange |
| 10 | swivel module - see FIGS. 2A, 2B |
| 11 | lower lip |
| 12 | segmented clamp - see FIGS. 3A, 3B, 3C |
| 13 | imaginary circle for vertical passages (FIG. 1) |
| 16 | swivel inner housing |
| 17 | seal plate |
| 20 | rotatable outer housing |
| 21 | lower axial swivel bearing |
| 22 | upper axial swivel bearing |
| 23 | lower radial bearing |
| 24 | upper radial bearing |
| 28 | fixed radial passage in inner housing 16 |
| 29 | circular groove in outer housing 20 |
| 30 | out passage |
| 40 | bolts |
| 41 | lower face seal |
| 42 | upper face seal |
| 50 | base manifold |
| 50-1,-50-2, etc. | radial inlets |
| M1, M2 . . . , etc. | vertical passages in base manifold |
| A, U, V . . . , etc. | vertical passages in swivel unit |
| 50A, 50B, 50C | liner conduit |
| 52 | stationary frame |
| 60 | swivel unit (MODULE 1) |
| 61 | outlet in swivel unit (MODULE -1) (FIG. 4) |
| 70 | swivel unit (MODULE 2) |
| 71 | outlet (MOD-2) |
| 80 | swivel unit (MODULE 3) |
| 81 | outlet (MOD-3) |
| 98 | static seal |
| 99 | static seal for liner conduits |

FIG. 1 is a cross section elevation view of a swivel unit 10 according to the invention where this section view shows the inner annular stationary structure 16, 17 oriented about a central longitudinal axis 5 through a central passage 3. The inner annular structure includes a swivel inner housing 16 and a seal plate 17 which are secured together by a plurality of bolts 40. The rotatable outer housing 20 is rotatably mounted with respect to swivel inner housing 16 and seal plate 17 by axial lateral swivel bearings 21, 22. Radial bearings 23, 24 provide radial support for outer housing 20 while rotating about stationary inner annular structure 16, 17.

The inner annular stationary structure 16, 17 includes an upper flange 8 formed about the outer periphery of seal plate 17, and inner housing 16 includes a lower flange 9 formed on an outer periphery of a circumferential lower lip 11 which extends a short distance below the bottom of inner housing 16. As illustrated below in FIGS. 3A, 3B, 3C, the flanges 8 and 9 are used to couple swivel units stacked on top of each other. A plurality of clamps 12 (see FIGS. 3A, 3B, 3C) secure the flanges 8, 9 to vertically stacked swivel units. Such clamping enables a swivel unit to be removed and replaced much more easily and rapidly than in prior swivel assemblies where bolts extend through all swivels in a stack.

The swivel unit 10 has plural vertical passages A, B . . . which have center points arranged on an imaginary circle 13 through the inner annular structure 16, 17. A total of nine passages are shown in the drawings, but fewer or more passages could be provided for certain applications. All of the passages are of the same diameter. FIG. 3 is a top view of a swivel unit like that of FIG. 1. FIG. 3 shows, for an example configuration, that all seal plates 17 can be identical and have nine holes so they can be oriented in any angular position as needed for passage of liner conduits 50B and 50C. For the arrangement shown in FIG. 2A, all passages below top seal plate 17 are used, and the holes in top seal plate 17 are unused. Usually in practice smaller utility swivels having small flow conduits passing through central passage 3 are attached on top of the stack of high pressure swivels. In this case the attachment covers the open holes in upper seal plate 17 and bolts 40 thereby protecting them from the elements. Swivel unit 10 of FIG. 1 shows passage A which terminates and communicates with radial groove 28, but passage A does not extend up to the hole through seal plate 17.

Outer housing 20 includes a circular groove 29 which communicates with radial passage 28 and has an outlet passage 30 which opens into groove 29. This arrangement allows fluid flow through stationary housing 16 passage A to radial passage 28 into groove 29 and outlet 30 of rotatable housing 20.

Upper and lower face seal arrangements 42, 41 are described in a corresponding patent application by the same inventors of this application. Such application has Ser. No. 14/178,106 and was filed May 19, 2015. Such application is incorporated herein by reference into this specification. Such seal arrangements allow swivel operation at extremely high pressures. Static seals 98 provide static sealing between inner housing 16 and seal plate 17.

FIG. 2A illustrates inner housings of a stack of swivel units like that of FIG. 1, where each unit 60, 70, 80 is like the others with each unit having nine vertical passages formed through the inner housing, with each passage starting in the bottom of the unit. The bottom unit 60 is illustrated as being stacked and clamped atop base manifold 50 which is secured on top of swivel stack support base 52 (see FIG. 4). As illustrated in FIGS. 3A, 3B, 3C . . ., base manifold 50 has nine radial inlets, 50-1, 50-2, 50-3, 50-4, 50-5, 50-6, 50-7, 50-8, 50-9 equally angularly spaced from each other with each communicating with its assigned vertical passage, M1, M2, M3, M4 . . . M9.

FIG. 2A illustrates that for an example swivel unit 60, its vertical passages A, U, V, B, W, X, C, Y, Z, are spaced equally about its bottom surface and are aligned respectively with vertical passages M1, M2, M3 . . . M9 of base manifold 50. For the example of FIG. 2A, and of FIGS. 3, 3A, 3B, 3C, each of the vertical passages in the swivel unit 60 and base manifold 50 are angularly spaced by 40 degrees (360°/9). FIG. 2A shows (see also FIG. 5) that vertical passages A, B and C terminate in their respective radial passage 28 and communicate with circumferential groove 29 in the outer housing 20, (see FIGS. 1 and 5) so fluids input into passages M1, M4 and M7 of base manifold 50, when aligned with vertical passages A, B and C of swivel unit 60 terminate via passages 28 to groove 29 and flow out via outlets 61 in swivel unit 60. (See FIG. 4) The other passages in swivel unit 60, U, V, W, X, Y and Z traverse the entire height of internal structure 16, 17 of the swivel 60 as illustrated in FIG. 2A. FIG. 1 shows that passages X, C, Y, and Z traverse the entire height of internal structure 16, 17 and illustrates that several configurations of vertical path commingling are possible as illustrated in FIG. 2A.

As shown in FIG. 2A, stacked swivel units 70 and 80 have the same vertical flow passages configuration as does swivel unit 60. Swivel unit 70 is rotated by 40° (360°/9) with respect to the orientation of swivel unit 60, so that the vertical passage A' of unit 70 is aligned with through vertical passage U of unit 60; vertical passage B' of unit 70 is aligned with through vertical passage W of unit 60; and vertical passage C' of unit 70 is aligned with through passage Y of unit 60. The fluid flow from vertical passages M2, M5 and M8 are commingled via radial passage 28' to groove 29' in unit 70. Finally, for this example, the unit 80, constructed like units 70, 60, but stacked on top of unit 70 and rotated by 40° with respect to unit 70, has it's A" vertical passage aligned with through passages U' of unit 70 and B" aligned with W' and C" with Y' of unit 70 so that fluid can flow from passage M3 of base manifold 50 to outlet A" of unit 80. In the same way, fluid communication is established between outlet B" and passage M6 via B" of unit 80, W' of unit 70 and X of unit 60. Fluid communication is established between outlet C" of unit 80 and M9 of base manifold 50 via passages C" of unit 80, Y' of unit 70 and Z of unit 60.

FIG. 2B illustrates another configuration of the swivel units of the invention. The swivel inner housing 16' of the swivel units 60', 70', 80' has nine vertical passages starting at the bottom of each unit. FIG. 2B illustrates that the vertical passages A, U, V, B, W, X, C, Y and Z of swivel unit 60' are equally spaced about its bottom surface and each one is aligned respectively with one of the vertical passages Ml, M2, M3 . . . M9 of base manifold 50. Only two of the vertical passages, A and B, terminate in a radial passage 28 in the swivel inner housing 16' and communicate with the circular groove 29. The swivel unit 70' has its A' and B' passages aligned with M2 and M5 of base manifold 50 and have their circular grooves 29' linked together. Swivel unit 80' is similar, but has its vertical passage B" blocked so that aligned passage W' does not communicate with groove 29". Many other configurations are possible. FIG. 2B shows that passages M7 to W", M8 to X", and M9 to C" remain open and available for additional single and two-path swivel modules mounted above swivel module 3 for more flow paths.

FIGS. 3, 3A, 3B and 3C illustrate the swivel stack of three units as indicated above for the arrangement of FIG. 2A and assembled atop of module 50. FIG. 3 is a top view of the stack of FIG. 2A with section lines 3A-3A, 3B-3B and 3C-3C, each spaced 40° apart. The top view section 3A-3A, FIG. 3A, shows that the top of the unit 80 has a passage Y" and Z' that pierces the top of the unit, but other passages, such as Z", U", V", W" X" cannot be seen because of the way the section A is positioned. FIG. 3A shows that a radial passage 50-1 from the exterior of manifold 50 communicates with vertical passage M1 of base manifold 50. Passage M1 is aligned with vertical passage A of unit 60. Passage A terminates and communicates with radial passage 28 of the swivel inner housing 16 which intersects with circular groove 29 and outlet 61 of rotatable outer housing 20.

Clamps 12 secure respective flanges 8 and 9 which face each other of the swivel units 60, 70 and 80. FIG. 3A shows that passages Z' and Y" of units 70 and 80 are aligned and pierce the top of the stack as illustrated in FIG. 3. A liner conduit 50A is placed in passages A and M1 with static seals 99 to prevent leakage when fluid flows in those vertically aligned passages.

FIG. 3B shows the section view of the three swivel units 60, 70, 80 clamped together where the section view is drawn as in FIG. 3 with section lines 3B-3B. FIG. 3 shows that passage Z" of module 80 is visible from the top of the stack. Liner conduit 50B with upper and lower static seals 99 is provided in the aligned passages of M2 of base manifold 50 and U of module 60, A' of module 70 to insure leak-free passage of fluid from passage M2 of base manifold 50 to the outlet 71 in module 70.

FIG. 3C shows the section view of the swivel units 60, 70, 80 clamped together where the section view is drawn as in FIG. 3 with section lines 3C-3C. Liner conduit 50C with static seals 99 is provided in the aligned passages of A" of module 80, U' of module 70, V of module 60 and M3 of base manifold 50 to insure leak free passage of fluid from inlet 50-3 of base manifold 50 to the outlet 81 in module 80.

Figure 4:
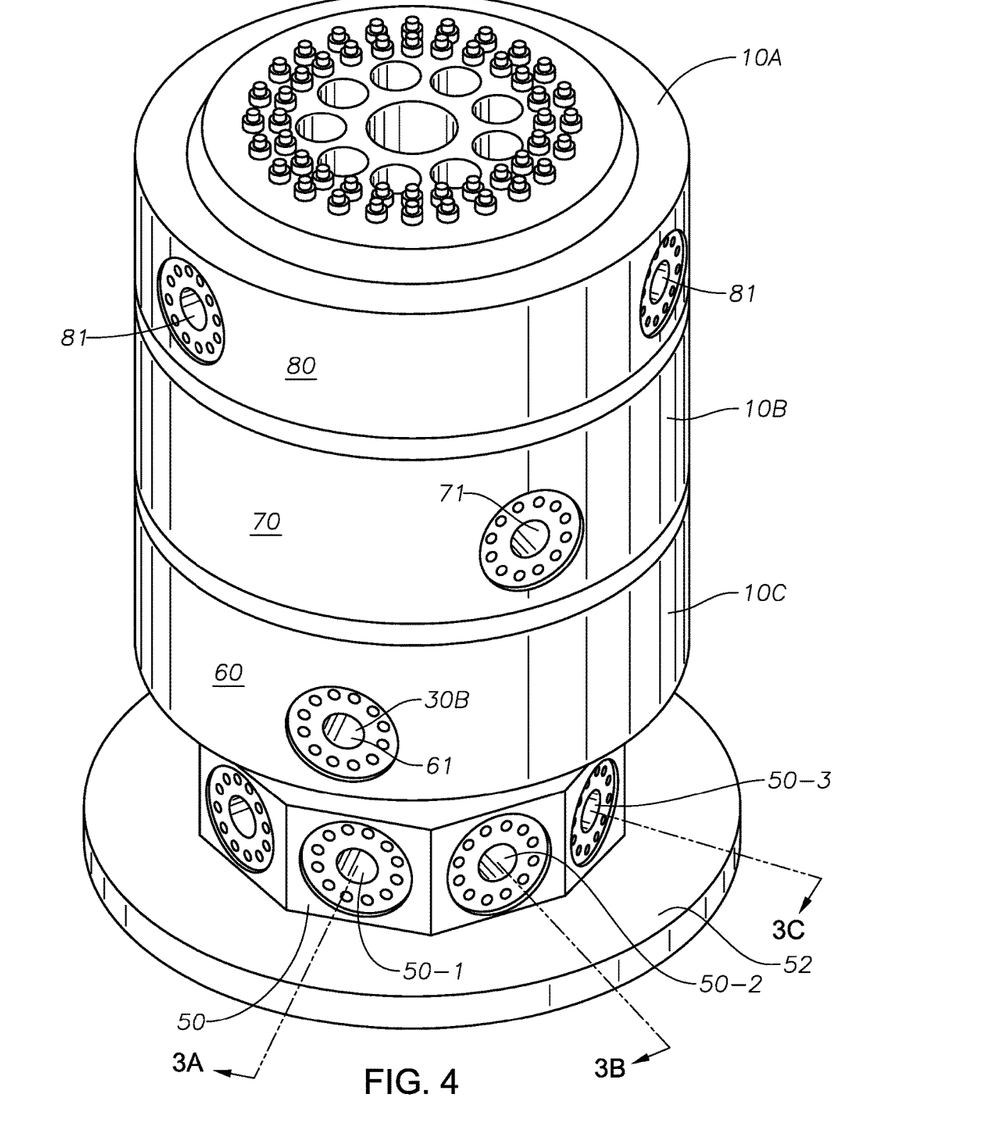
FIG. 4 in an elevation view of the swivel stack of FIGS. 3A, 3B, 3C and with the vertical passages layout of FIG. 2A.

FIG. 4 is an elevation view of the stack of three swivel modules 60, 70, 80 stacked and secured to each other as illustrated in FIGS. 2A, 3, 3A, 3B and 3C. The swivel modules are stacked atop base manifold 50 which is secured to support base 52. Outlets 61, 71, 81 can be in any angular rotation position since outer housings 20 rotate. The illustration happens to have them aligned for convenience.

Figure 5:
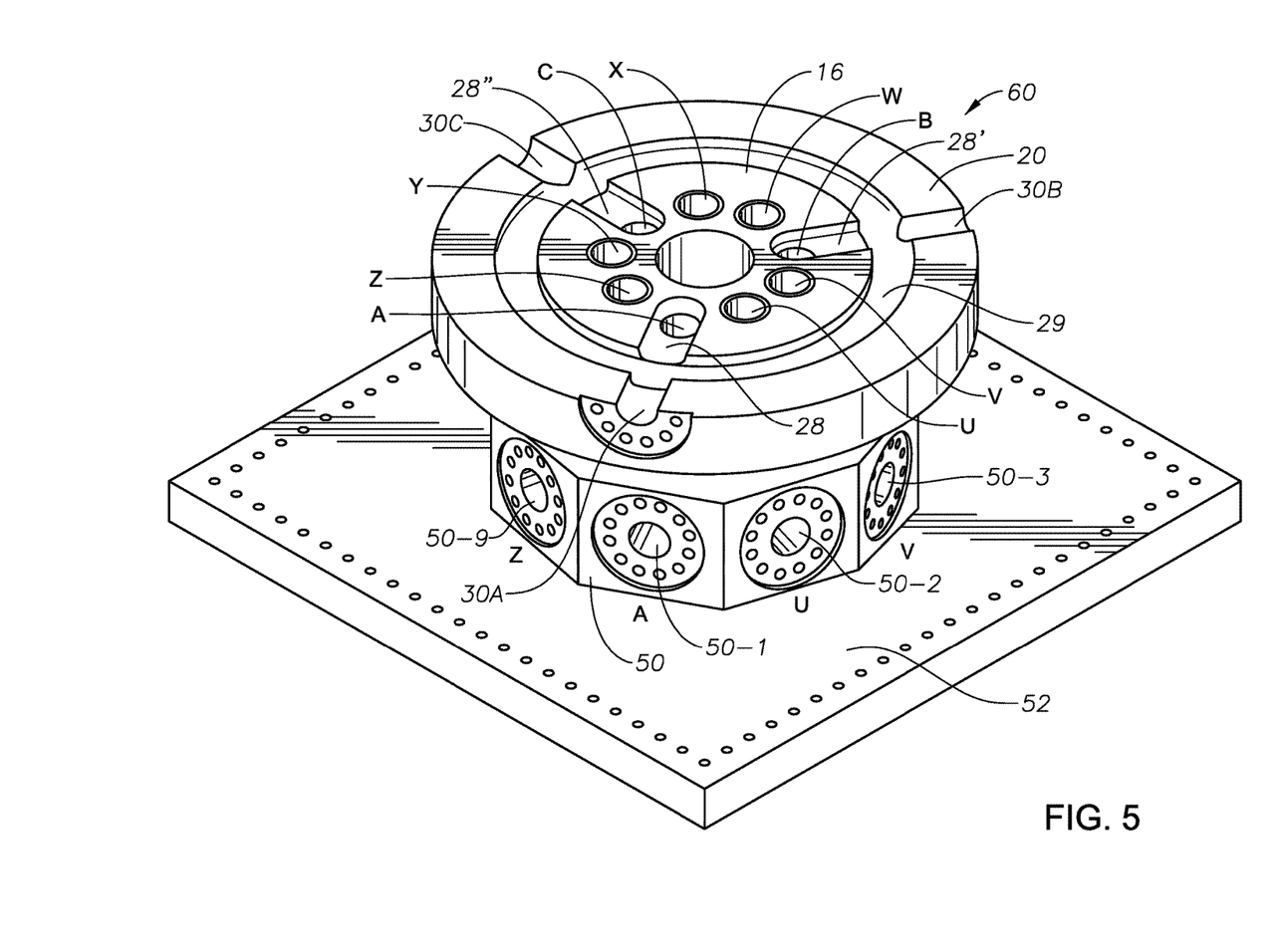
FIG. 5 is an elevation view of the stack of FIG. 4 showing the lower swivel unit with the other swivel units removed to illustrate the stationary inner housing with vertical passages and the rotatable outer housing, all mounted on a base manifold.

FIG. 5 shows the swivel stack of FIG. 4, but with modules 70 and 80 removed and with a horizontal section view through module 60 presented. Vertical passages A, U, V, B, W, X, C, Y, Z are seen opening through inner housing 16 of module 60. The horizontal circular groove 29 in outer housing 20 communicates respectively with vertical passages A, B, C via radial passages 28, 28' and 28" which in turn communicate with outlets 30A, 30B and 30C. The module 60 is illustrated as being secured to the top of base manifold 50. Inlets 50-1, 50-2 and 50-3 communicate with vertical passages A, U and V.

The orientation of modules 60, 70, and 80 of FIGS. 2, 3, 3A, 3B, 3C, 4, 5 is by way of example as to how swivel modules as illustrated in FIG. 1 can be oriented.

Of course the swivel stack base 50 is to be positioned on a stationary frame 52 anchored to the sea floor. Risers from the sea floor are connected to the inlets 50-1, 50-2, . . . etc., of the manifold base 50. Fluid lines to the vessel are connected to the outlets 61, 71, 81 . . . etc., and rotate, with the vessel, with respect to the base manifold 50. Although FIGS. 2A, 2B, through 5 illustrate coupling of multiple vertical passages, such as passages A, B and C coupled by groove 29 in module 60, the swivel units can be configured so that one or more vertical passages can extend from the base module 50 to the top module of the module stack. Many different configurations can be formed while using identical components.

The swivel module 10 of FIG. 1, with its modification as illustrated in FIG. 2-5 have advantages of,
(1) ease of assembly when stacking by connecting flanges of adjacent modules together rather than using bolts which extend the entire height of the stack;
(2) prefabrication of swivel units so that a stack can be assembled quickly when needed;

(3) relative ease of replacing a swivel unit in a stack if needed without disturbing swivel units below a unit which needs to be replaced. For example, when using a stack of three identical swivel modules, 10A, 10B, 10C, an additional spare unit 10 can be stored on the vessel. If any module fails, the spare unit can be used as a replacement; and (4) single swivel units can be independently assembled and tested at the factory for installation in any position in the stack. This advantage provides significant cost reduction and decreased delivery times.

What is claimed is:

1. A fluid swivel unit (10) comprising,
a stationary inner annular structure (16, 17) having a central passage (3) on a central longitudinal axis (5) and a plurality of vertical passages spaced uniformly about said central passage (3) and the central longitudinal axis,
a rotatable outer housing (20) positioned coaxially about said inner annular structure (16, 17) with said outer housing (20) arranged and designed to rotate relative to said inner annular structure (16, 17) about the central longitudinal axis (5),
said stationary inner annular structure (16, 17) including a first horizontal flange (8) about an outer circumference of an upper portion of said inner annular structure and a second horizontal flange (9) on a lower lip (11) about an outer circumference of a lower portion of said inner annular structure, and
a clamp assembly (12),
wherein said first and second flanges (8), (9) arranged and designed for stacked connection of said fluid swivel unit (10) with other fluid swivel units such that said first flange (8) of said fluid swivel unit (10) is capable of being secured to a second flange (9) of a second fluid swivel unit by clamp assembly (12) placed about the circumference of the first and second fluid swivel units, thereby creating a stacked connection of fluid swivel units.

2. The fluid swivel unit (10) of claim 1 wherein,
a horizontal circular groove (29) is disposed in said outer housing (20),
said circular groove (29) is defined by a circle of a horizontal cross section through said outer housing (20), said groove (29) intersecting with a first fixed radial passage (28) in said inner annular structure (16, 17) which intersects with a first vertical passage (A) of said plurality of vertical passages, said first vertical passages (A) extends from a lower surface of said inner annular structure (16, 17) and terminates at said first fixed radial passage (28) so that fluid communication can be established between said circular groove (29) and said first vertical passage (A), and
a radial outlet (30) is disposed in said outer housing (20) that is positioned for fluid communication with said horizontal circular groove (29) and said first vertical passage (A) via said first fixed radial passage (28),
so that a fluid communication path is established between said rotatable outer housing (20) and said stationary inner annular structure (16, 17) via said first vertical passage (A), said first fixed radial passage (28), a portion of said circular groove (29) and said radial outlet (30).

3. The fluid swivel unit (10) of claim 2, wherein said inner annular structure (16, 17) comprises a seal plate (17) secured to an inner housing (16), and at least two vertical through passages (U, V . . . ) extending from a lower surface of said inner housing through said inner annular structure to a top surface of said seal plate.

4. The fluid swivel unit (10) of claim 3, wherein said first horizontal flange (8) is disposed on an outer periphery of said seal plate (17), and said second horizontal flange (9) is disposed on an outer periphery of said inner housing (16).

5. The fluid swivel unit (10) of claim 1,
wherein said inner annular structure (16, 17) includes a swivel seal plate (17) secured to a swivel inner housing (16) by a plurality of bolts (40) spaced around said central longitudinal axis (5).

6. The fluid swivel unit (10) of claim 5 wherein,
said first horizontal flange (8) is disposed on an outer periphery of said swivel seal plate (17), and
said second horizontal flange (9) is disposed on an outer periphery of said swivel inner housing (16).

7. The fluid swivel unit (10) of claim 6 further comprising,
a horizontal circular groove (29) disposed in said swivel outer housing (20),
three fixed radial passages (28, 28', 28") formed in said swivel inner housing (16), each equally angularly separated from each other, and each in fluid communication with said horizontal circular groove (29) of said swivel outer housing (20),
three vertical passages (A, B, C) of said plurality of vertical passages extending from a lower surface of said inner housing (16), with each of said three vertical passages (A,B,C) terminating with one of the said three fixed radial passages (28, 28', 28") so that fluid communication is established between said horizontal circular groove (29) and said three vertical passages (A, B, C), and
three radial outlets (30, 30', 30") disposed in said outer housing (20) in fluid communication with said horizontal circular groove (29) so that a plurality of fluid communication paths are established between said rotatable outer housing (20) and said stationary inner annular structure (16, 17) via said three vertical passages (A, B, C), said three fixed radial passages (28, 28', 28"), said circular groove (29) and said three radial outlets (30, 30', 30").

8. The fluid swivel unit (10) of claim 7 wherein,
six additional vertical passages (U, V, W, X, Y, Z) of said plurality of vertical passages extend from said lower surface of said inner housing (16) through said stationary inner annular structure to a top surface of said seal plate (17),
whereby said nine vertical passages (A, U, V, B, W, X, C, Y, Z) are equally spaced in a circle of said stationary inner annular structure about said central longitudinal axis (5).

9. The fluid swivel unit (10) of claim 6 further comprising,
a horizontal circular groove (29) disposed in said swivel outer housing (20),
two fixed radial passages (28, 28') formed in said swivel inner housing (16) and each in fluid communication with said horizontal circular groove,
two vertical passages (A, B) that extend from a lower surface of said inner housing (16), with each of said two vertical passages terminating with one of said two fixed radial passages so that fluid communication is established between said horizontal circular groove and said two vertical passages, and
two radial outlets (30, 30') disposed in said outer housing in fluid communication with said horizontal circular groove so that a plurality of fluid communication paths are established between the rotatable outer housing and the stationary inner annular structure (16, 17) via the vertical passages (A, B), the fixed radial passages (28, 28'), the circular groove (29) and the radial outlets (30, 30').

10. The fluid swivel unit (10) of claim 9, wherein,
seven additional vertical passages (U, V, W, X, C, Y, Z) extend from the lower surface of said inner housing (16) through said stationary inner annular structure to a top surface of said seal plate (17),
whereby the nine vertical passages (A, U, V, B, W, X, C, Y, Z) are equally spaced in a circle of said stationary inner annular structure about said central longitudinal axis (5).

11. A fluid swivel assembly comprising,
a base manifold (50) disposed about a central longitudinal axis (5) and having an upper flange about an outer circumference of said base manifold, said base manifold having a plurality of inlet passages (50-1, 50-2 . . . ) and a plurality of manifold vertical passages (M1, M2, . . . ), each of said manifold vertical passages (M1, M2, . . . ) in fluid communication with a corresponding one of said inlet passages (50-1, 50-2 . . . ),
a first fluid swivel unit (60) comprising :
  a stationary inner annular structure (16, 17) having a central passage (3) on the central longitudinal axis (5) and a plurality of vertical passages spaced uniformly about said central passage (3) and the central longitudinal axis, said inner annular structure having a lower flange (9) about an outer circumference of a lower portion of said inner annular structure,
  a rotatable outer housing (20) positioned coaxially about said inner annular structure (16, 17) with said outer housing (20) arranged and designed to rotate relative to said inner annular structure (16, 17) about the central longitudinal axis (5),
  a horizontal circular groove (29) disposed in said outer housing (20) of said first fluid swivel unit (60), said circular groove (29) defined by a circle of a horizontal cross section of said outer housing (20), said circular groove (29) in fluid communication with a first fixed radial passage (28) in said inner annular structure (16, 17) which intersects with a first vertical passage (A) that extends from a lower surface of said inner annular structure (16, 17) and terminates at said first fixed radial passage (28) so that fluid communication can be established between said circular groove (29) and said first vertical passage (A) of said inner annular structure,
  a radial outlet (61) disposed in said rotatable outer housing (20), said radial outlet (61) in fluid communication with said horizontal circular groove (29) and said first vertical passage (A) of said inner annular structure via said first fixed radial passage (28), so that a fluid communication path is established between the rotatable outer housing (20) and the stationary inner annular structure (16, 17) via said first vertical passage (A), the first fixed radial passage (28), a portion of the circular groove (29) and the radial outlet (61),
wherein said first vertical passage (A) of said first fluid swivel unit (60) is aligned with a first said vertical passage (M1) of said base manifold (50), and
a clamp assembly securing said first fluid swivel unit to said base manifold, said clamp assembly clamping said lower flange of said first fluid swivel unit to said upper flange of said base manifold,
a conduit (50A) placed in the first vertical passage (A) and in the base manifold first vertical passage (M1) so as to achieve fluid communication through the first vertical passage (A) of said first fluid swivel unit (60) and the base manifold first vertical passage (M1).

12. The fluid swivel assembly of claim 11, wherin said inner annular structure (16, 17) further comprises
a second vertical passage (U), a third vertical passage (V), a fourth vertical passage (B), a fifth vertical passage (W), a sixth vertical passage (X), a seventh vertical passage (C), an eighth vertical passage (Y) and a ninth vertical passage (Z),
wherein said nine vertical passages are spaced at equal angular intervals about a circle through a horizontal section of said first fluid swivel unit (60).

13. The fluid swivel assembly of claim 12, further including a second fluid swivel unit (70) having a stationary inner annular structure (16', 17') including,
  a first vertical passage (A'),
  a second vertical passage (U'),
  a third vertical passage (V'),
  a fourth vertical passage (B'),
  a fifth vertical passage (W'),
  a sixth vertical passage (X',),
  a seventh vertical passage (C'),
  an eighth vertical passage (Y') and
  a ninth vertical passage (Z')
wherein each of said vertical passages in said second fluid swivel unit (70) are spaced at equal angular intervals about a circle through a horizontal section of said second fluid swivel unit (70).

14. The fluid swivel assembly of claim 13 wherein,
said second fluid swivel unit (70) is stacked and secured to the top of said first fluid swivel unit (60) and wherein,
said second fluid swivel unit (70) includes,
  the stationary inner annular structure (16', 17') comprising an inner housing (16'),
  a rotatable outer housing (20') positioned coaxially about said inner annular structure (16', 17') with said outer housing (20') arranged and designed to rotate relative to said inner annular structure (16', 17') about said central longitudinal axis (5),
  a horizontal circular groove (29') disposed in said outer housing (20') of said second fluid swivel unit (70), said circular groove (29') defined by a circle of a horizontal cross-section of said outer housing (20'), said circular groove (29') in fluid communication with a first fixed radial passage (28') in said inner housing (16') which intersects with said first vertical passage (A') that extends from a lower surface of said inner annular structure (16', 17') and terminates at said first fixed radial passage (28') so that fluid communication can be established between said circular groove (29') and said first vertical passage (A') of said second fluid swivel unit, and
  a radial outlet (30') disposed in said rotatable outer housing (20'), said radial outlet (30') in fluid communication with said horizontal circular groove (29') and said first vertical passage (A') via said first fixed radial passage (28') so that a fluid communication path is established between the rotatable outer housing (20') and the stationary inner annular structure (16', 17') via the first vertical passage (A'), the first fixed radial passage (28'), a portion of the circular groove (29') and the radial outlet (30'), wherein said stationary inner structure (16', 17') of said second fluid swivel unit (70) is aligned with said stationary inner structure (16, 17) of said first fluid swivel unit (60) so that said first vertical passage (A') of said second fluid swivel unit (70) is aligned with said second vertical passage (U) of said first fluid swivel unit (60) and a second vertical passage (M2) of said base manifold (50).

15. The fluid swivel assembly of claim 14 wherein, said fourth vertical passage (B') of said second fluid swivel unit (70) is aligned with said fifth vertical passage (W) of said first fluid swivel unit (60), and said fifth vertical passage (W) of said first fluid swivel unit (60) is aligned with a fifth vertical flow passage (M5) of said base manifold (50).

16. The fluid swivel assembly of claim 15, wherein said seventh vertical passage (C') of said second fluid swivel unit (70) is aligned with said eighth vertical passage (Y) of said first fluid swivel unit (60), and said eighth vertical passage (Y) of said first fluid swivel unit (60) is aligned with an eighth vertical passage (M8) of said base manifold (50).

17. The fluid swivel assembly of claim 11 wherein, said stationary inner annular structure (16, 17) includes an upper flange (8) about an outer circumference of an upper portion of said inner annular structure, said upper and lower flanges (8), (9) of said inner annular structure arranged and designed for stacked connections of said first fluid swivel unit (60) with other fluid swivel units.

18. A fluid swivel assembly comprising, a first fluid swivel module (10) having,
- a stationary inner annular structure (16, 17) including a first flange (8) about an outer circumference of an upper portion of said inner annular structure and a second flange (9) on a lower lip (11) about an outer circumference of a lower portion of said inner annular structure,
- a rotatable outer housing (20) positioned coaxially about said inner annular structure (16, 17) with said outer housing (20) arranged and designed to rotate relative to said inner annular structure (16, 17) about a central longitudinal axis (5),
- said stationary inner annular structure (16, 17) including a central passage (3) on the central longitudinal axis (5) and a number N of vertical passages equally angularly spaced about a circle through a horizontal section of said inner annular structure (16, 17), such that each vertical passage is angularly spaced from another by 360/N degrees, the number N of vertical passages including at least a first vertical passage (A), a second vertical passage (U), and a third vertical passage (V),
- a horizontal circular groove (29) disposed in said outer housing (20) of said first fluid swivel module (10), said circular groove (29) defined by a circle of a horizontal cross-section of said outer housing (20), said circular groove (29) in fluid communication with a first fixed radial passage (28) in said inner annular structure (16, 17) which intersects with said first vertical passage (A) that extends from a lower surface of said inner annular structure (16, 17) and terminates at said first fixed radial passage (28) so that fluid communication can be established between said circular groove (29) and said first vertical passage (A), and
- a radial outlet (30) disposed in said rotatable outer housing (20), said radial outlet (30) in fluid communication with said horizontal circular groove (29) and said first vertical passage (A) via said fixed radial passage (28), so that a fluid communication path is established between the rotatable outer housing (20) and the stationary inner structure (16, 17) via the first vertical passage (A), the fixed radial passage (28), a portion of the circular groove (29) and the radial outlet (30), and a second fluid swivel module (10) configured like that if said first fluid swivel module, wherein said second fluid swivel module (10) is stacked on top of said first fluid swivel module (10) with an inner annular structure (16, 17) of the second fluid swivel module (10), rotated by 360/N degrees from the inner annular structure of the first fluid swivel module (10), such that a first vertical passage (A') of the second fluid swivel module (10) is aligned with the second vertical passage (U) of said first fluid swivel module (10), and a second vertical passage (U') of the second fluid swivel module (10) is aligned with the third vertical passage (V) of said first fluid swivel module(10), and a clamp assembly securing said second fluid swivel model to said first fluid swivel module, said clamp assembly clamping said second flange of said second fluid swivel module to said first flange of said first fluid swivel module.

19. The fluid swivel assembly of claim 18 wherein the number N of vertical passages is nine, such that each vertical passage is angularly separated from an adjacent vertical passage by forty degrees.

20. A fluid swivel assembly comprising:

a base manifold disposed about a central longitudinal axis and having an upper flange about an outer circumference of said base manifold, said base manifold having a plurality of inlet passages (50-1, 50-2 . . . ) and a plurality of manifold vertical passages (M1, M2, . . . ) equally angularly spaced around the circumference of said base manifold, each of said manifold vertical passages in fluid communication with a corresponding one of said inlet passages;

a first fluid swivel unit (60) stacked on top of said base manifold, said first fluid swivel unit comprising:
- a stationary inner annular structure comprising an inner housing, said inner annular structure having a central passage (3) on the central longitudinal axis and having a first vertical passage (A), a second vertical passage (U), a third vertical passage (V), a fourth vertical passage (B), a fifth vertical passage (W), a sixth vertical passage (X), a seventh vertical passage (C), an eighth vertical passage (Y) and a ninth vertical passage (Z),
- wherein said nine vertical passages are spaced at equal angular intervals about a circle through a horizontal section of said first fluid swivel unit and spaced uniformly about said central passage;
- said inner annular structure having a lower flange (9) about an outer circumference of a lower portion of said inner housing;
- a clamp assembly securing said first fluid swivel unit to said base manifold, said clamp assembly clamping said lower flange of said first fluid swivel unit to said upper flange of said base manifold;
- a rotatable outer housing positioned coaxially about said inner annular structure with said outer housing arranged and designed to rotate relative to said inner annular structure about the central longitudinal axis;

a horizontal circular groove disposed in said rotatable outer housing of said first fluid swivel unit, said circular groove defined by a circle of a horizontal cross-section of said outer housing;

said first vertical passage (A) extending from a lower surface of said inner housing and terminating at a first fixed radial passage (28) in said inner housing, said first fixed radial passage in fluid communication with said first vertical passage and with said horizontal circular groove;

said fourth vertical passage (B) extending from the lower surface of said inner housing and terminating at a second fixed radial passage (28') in said inner housing, said second fixed radial passage in fluid communication with said fourth vertical passage and with said horizontal circular groove;

first and second radial outlets (30A, 30B) disposed in said rotatable outer housing and in fluid communication with said horizontal circular groove;

wherein said first vertical passage (A) of said first fluid swivel unit (60) is aligned with a first said vertical passage (M1) of said base manifold, and said fourth vertical passage (B) of said fluid swivel unit (60) is aligned with a fourth said vertical passage (M4) of said base manifold;

a first conduit (50A) placed in said inner annular structure first vertical passage and in said base manifold first vertical passage so as to achieve fluid communication through said base manifold first vertical passage and said first vertical passage of said first fluid swivel unit; and a second conduit (50A) placed in said inner annular structure fourth vertical passage and in said base manifold fourth vertical passage so as to achieve fluid communication through said fourth vertical passage of said base manifold and said fourth vertical passage of said first fluid swivel unit.

21. The fluid swivel assembly of claim 20, wherein, said seventh vertical passage (C) extends from the lower surface of said inner housing and terminates at a third fixed radial passage (28") in said inner housing, said third fixed radial passage in fluid communication with said seventh vertical passage and with said horizontal circular groove;

a third radial outlet (30C) disposed in said rotatable outer housing and in fluid communication with said horizontal circular groove;

wherein said seventh vertical passage (C) of said first fluid swivel unit (60) is aligned with a seventh said vertical passage (M7) of said base manifold, a third conduit (50A) placed in said inner annular structure seventh vertical passage and in said base manifold seventh vertical passage so as to achieve fluid communication through said seventh vertical passage of said base manifold and said seventh vertical passage of said first fluid swivel unit.

22. The fluid swivel assembly of claim 20, further comprising:

a second fluid swivel unit (70) being the same as said first fluid swivel unit (60), said second fluid swivel unit having a stationary inner annular structure with nine vertical passages, the first and fourth vertical passages terminating at first and second fixed radial passages respectively in said inner annular structure; said second fluid swivel unit stacked on and secured to the top of said first fluid swivel unit, said nine vertical passages of said second fluid swivel unit being axially aligned with said nine vertical passages of said first fluid swivel unit such that neither of said first and fourth vertical passages in said second fluid swivel unit are axially aligned with either of said first and fourth vertical passages in said first fluid swivel unit.

23. The fluid swivel assembly of claim 20, further comprising upper and lower seals (99), said upper seals for sealing between each said conduit and said respective vertical passage of said first fluid swivel unit, and said lower seals for sealing between each said conduit and said respective vertical passage in said base manifold.

24. A fluid swivel assembly comprising:

a base manifold disposed about a central longitudinal axis and having a horizontal flange about an outer circumference of said base manifold, said base manifold having a plurality of inlet passages and a plurality of manifold vertical passages equally angularly spaced around the circumference of said base manifold, each of said manifold vertical passages in fluid communication with a corresponding one of said inlet passages;

a first fluid swivel unit stacked on the top of said base manifold, said first fluid swivel unit including:

a stationary inner annular structure comprising an inner housing and a seal plate, said seal plate including a first horizontal flange about an outer circumference of an upper portion of said inner annular structure and said inner housing having a second horizontal flange about an outer circumference of a lower portion of said inner annular structure, said first and second horizontal flanges arranged and designed for stacked connections of said first fluid swivel unit with other fluid swivel units or said base manifold;

a rotatable outer housing positioned coaxially about said inner annular structure with said outer housing arranged and designed to rotate relative to said inner annular structure about the central longitudinal axis;

a horizontal circular groove disposed in said outer housing of said first fluid swivel unit, said circular groove defined by a circle of a horizontal cross-section of said outer housing, said circular groove in fluid communication with a first fixed radial passage in said inner housing which intersects with a first vertical passage (A) that extends from a lower surface of said inner annular structure and terminates at said first fixed radial passage so that fluid communication can be established between said circular groove and said first vertical passage of said inner annular structure; and a radial outlet disposed in said rotatable outer housing, said radial outlet in fluid communication with said horizontal circular groove and said first vertical passage of said inner annular structure via said first fixed radial passage, so that a fluid communication path is established between said rotatable outer housing and said stationary inner annular structure via said first vertical passage, said first fixed radial passage, a portion of said circular groove and said radial outlet, wherein said first vertical passage (A) of said first fluid swivel unit is aligned with a first said vertical passage (Ml) of said base manifold;

a conduit (50A) placed in said first vertical passage (A) and in said base manifold first vertical passage (Ml) so as to achieve fluid communication through said first vertical passage of said first fluid swivel unit and said base manifold first vertical passage;

an upper seal sealing between said conduit and said first vertical passage of said first fluid swivel unit, and a lower seal sealing between said conduit and said first vertical passage in said base manifold; and a clamp assembly securing said first fluid swivel unit to said base manifold, said clamp assembly clamping said second horizontal flange of said first fluid swivel unit to said horizontal flange of said base manifold.

25. The fluid swivel assembly of claim 24, wherein said inner annular structure further comprises a second vertical passage, a third vertical passage, a fourth vertical passage, a fifth vertical passage, and a sixth vertical passage, a seventh vertical passage (C), an eighth vertical passage (Y) and a ninth vertical passage (Z), wherein said nine vertical passages are spaced at equal angular intervals about a circle through a horizontal section of said first fluid swivel unit.

26. A modular fluid swivel assembly comprising:

a base manifold (50) disposed about a central longitudinal axis (5) and having at least first, second and third vertical passages (M1, M2, M3) and at least three radial inlets (50-1, 50-2, 50-3), the at least three manifold vertical passages uniformly spaced around the circumference of the base manifold and extending to an upper end of the base manifold, each of the manifold vertical passages in fluid communication with a corresponding one of the radial inlets;

a plurality of modular fluid swivel units (10) arranged and designed to stack on and be secured to the top of the base manifold and the top of another modular fluid swivel unit, each modular fluid swivel unit comprising:

a stationary inner annular structure (16, 17) comprising:

an inner housing (16) having a fixed radial passage (28) which intersects with a first vertical passage (A) that extends from a lower surface of the inner housing and terminates at the fixed radial passage, the inner housing having at least second and third vertical passages extending vertically through the inner housing;

an upper plate (17) having at least first, second and third vertical passages extending vertically through the upper plate; and the upper plate arranged and designed to be secured to the inner housing such that the vertical passages of the upper plate are axially aligned with the vertical passages of the inner housing;

a rotatable outer housing (20) positioned coaxially about the inner annular structure with the outer housing arranged and designed to rotate relative to the inner annular structure about the central longitudinal axis;

the rotatable outer housing defining a circumferential groove (29) in fluid communication with a radial outlet (61) disposed in the rotatable outer housing, the circumferential groove also in fluid communication with the fixed radial passage of the inner housing, wherein a fluid communication path is established between the rotatable outer housing and the stationary inner structure via the first vertical passage, the fixed radial passage, the circumferential groove and the radial outlet.

27. The modular fluid swivel assembly of claim 26, wherein a first modular fluid swivel unit is mounted on top of the base manifold and a second modular fluid swivel unit is mounted on top of the first modular fluid swivel unit.

28. The modular fluid swivel assembly of claim 27, wherein the first vertical passage (A) of the inner housing of the first modular fluid swivel unit is axially aligned with the manifold first vertical passage (M1) and the first vertical passage (A) of the inner housing of the second modular fluid swivel unit is axially aligned with the manifold second vertical passage (M2), the modular fluid swivel assembly further comprising:

a first liner conduit (50A) placed in the first vertical passage (A) of the inner housing of the first modular fluid swivel unit and the manifold first vertical passage (M1); and a second liner conduit (50B) placed in the first vertical passage (A) of the inner housing of the second modular fluid swivel unit, extending through the aligned second vertical passage in the first modular fluid swivel unit and into the manifold second vertical passage (M2).

29. The modular fluid swivel assembly of claim 28, wherein a third modular fluid swivel unit is mounted on top of the second modular fluid swivel unit, and the first vertical passage (A) of the inner housing of the third modular fluid swivel unit is axially aligned with the manifold third vertical passage (M3), the modular fluid swivel assembly further comprising:

a third liner conduit (50C) placed in the first vertical passage (A) of the inner housing of the third modular fluid swivel unit, extending through the aligned second vertical passage in the second modular fluid swivel unit, extending through the aligned third vertical passage in the first modular fluid swivel unit and into the manifold third vertical passage (M3).

30. The modular fluid swivel assembly of claim 29, further comprising:

upper and lower seals, the upper seals for sealing between each liner conduit and the first vertical passage (A) of the inner housing of each modular fluid swivel unit, and the lower seals for sealing between each liner conduit and the corresponding vertical passage in the manifold.

31. The modular fluid swivel assembly of claim 27, each modular fluid swivel unit further comprising:

the upper plate including a first horizontal flange about an outer circumference of an upper portion of the upper plate and a second horizontal flange about an outer circumference of a lower portion of the inner housing, the first and second flanges arranged and designed for stacked connection of the modular fluid swivel unit with other modular fluid swivel units.

32. The modular fluid swivel assembly of claim 31, wherein the second flange of the second modular fluid swivel unit is secured to the first flange of the first modular fluid swivel unit by a clamp assembly.

* * * * *